US008514709B2

(12) United States Patent
Cromer et al.

(10) Patent No.: US 8,514,709 B2
(45) Date of Patent: Aug. 20, 2013

(54) AUTONOMIC DISASSOCIATION OF CLIENTS IN A WIRELESS LOCAL AREA NETWORK

(75) Inventors: Daryl Carvis Cromer, Apex, NC (US);
Philip John Jakes, Durham, NC (US);
Howard Jeffrey Locker, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2793 days.

(21) Appl. No.: 10/742,502

(22) Filed: Dec. 19, 2003

(65) Prior Publication Data
US 2005/0135372 A1 Jun. 23, 2005

(51) Int. Cl.
*H04L 12/26* (2006.01)

(52) U.S. Cl.
USPC ..... 370/235; 370/237; 370/236.1; 370/236.2; 370/230.1; 370/230

(58) Field of Classification Search
USPC .............. 370/229, 230, 230.1, 231, 232, 233, 370/234, 235, 236, 236.1, 237, 236.2, 238, 370/238.1, 254, 255, 256, 431, 433, 437, 370/447, 462, 338
See application file for complete search history.

(56) References Cited

U.S. PATENT DOCUMENTS

| | | | |
|---|---|---|---|
| 5,181,200 A | 1/1993 | Harrison | |
| 5,570,366 A | 10/1996 | Baker et al. | |
| 5,987,062 A | 11/1999 | Engwer et al. | |
| 6,067,297 A | 5/2000 | Beach | |
| 6,253,083 B1 | 6/2001 | Hacena et al. | |
| 6,332,077 B1 | 12/2001 | Wu et al. | |
| 6,404,772 B1 | 6/2002 | Beach et al. | |
| 6,469,991 B1 | 10/2002 | Chuah | |
| 6,473,413 B1 | 10/2002 | Chiou et al. | |
| 6,674,403 B2 * | 1/2004 | Gray et al. | 342/463 |
| 6,799,054 B2 * | 9/2004 | Shpak | 455/525 |
| 6,804,532 B1 * | 10/2004 | Moon et al. | 455/552.1 |
| 6,891,820 B1 * | 5/2005 | Pham et al. | 370/338 |
| 6,961,573 B1 * | 11/2005 | Moon et al. | 455/445 |
| 7,035,243 B2 * | 4/2006 | Shpak | 370/338 |
| 7,203,183 B2 * | 4/2007 | Cromer et al. | 370/338 |
| 2003/0210672 A1 * | 11/2003 | Cromer et al. | 370/338 |

FOREIGN PATENT DOCUMENTS

| | | |
|---|---|---|
| EP | 0851633 A2 | 7/1998 |
| JP | 200034987 A | 12/2000 |
| WO | WO 03/015315 A1 | 2/2003 |

* cited by examiner

*Primary Examiner* — Hassan Phillips
*Assistant Examiner* — Mark A Mais
(74) *Attorney, Agent, or Firm* — Steven M. Greenberg, Esq.; Carey, Rodriguez, Greenberg & O'Keefe

(57) ABSTRACT

A wireless network access point is described which provides the resources of a backbone network to wireless clients. The access point is able to detect a degraded condition on the backbone network. Upon detecting the degraded condition, the access point selectively dissociates clients on the wireless network. In order to select which clients are dissociated first, a predetermined client dissociation policy is established. The policy can include account priority, bandwidth utilization, elapsed time since last transfer, and, amongst other criteria, whether the client is currently transferring in peer-to-peer mode on the wireless network. Upon detecting the degraded condition, either immediately or after a predetermined delay to ensure that the degraded condition is not temporary, clients on the wireless network are dissociated according to the pre-established policy.

27 Claims, 8 Drawing Sheets

AUTONOMIC DISASSOCIATION OF CLIENTS IN A WIRELESS LOCAL AREA NETWORK

BACKGROUND OF THE INVENTION

This invention pertains to wireless networking systems and, more particularly, to a wireless network access point which provides the resources of a backbone network to wireless clients. The access point is able to detect a degraded condition on the backbone network and autonomically dissociate clients thereby forcing clients into association with alternative access points having improved backbone connectivity.

Within the past two decades, the development of raw computing power coupled with the proliferation of computer devices has grown at exponential rates. This phenomenal growth, along with the advent of the Internet, has led to a new age of accessibility to other people, other systems, and to information.

The simultaneous explosion of information and integration of technology into everyday life has brought on new demands for how people manage and maintain computer systems. The demand for information technology professionals is already outpacing supply when it comes to finding support for someone to manage complex, and even simple computer systems. As access to information becomes omnipresent through personal computers, hand-held devices, and wireless devices, the stability of current infrastructure, systems, and data is at an increasingly greater risk to suffer outages. This increasing complexity, in conjunction with a shortage of skilled information technology professionals, points towards an inevitable need to automate many of the functions associated with computing today.

Autonomic computing is one proposal to solve this technological challenge. Autonomic computing is a concept to build a system that regulates itself much in the same way that a person's autonomic nervous system regulates and protects the person's body.

Within the past decade, there has been accelerated growth in portable computing to meet the demands of a mobile workforce. This voluminous mobile workforce has traditionally relied on a cable connection to a backbone network in order to have access to resources such as printers, e-mail servers, databases, storage, and even Internet connections. Within the past few years alone, the industry has seen rapid deployment of wireless local area networks which offer increased convenience over cable connections to backbone networks. In addition to convenience, wireless networks offer the ability to roam while maintaining a network connection.

Recently, a standard for wireless local area networks known as the IEEE 802.11 standard has been adopted and has gained acceptance among the industrial, scientific and medical communities. The IEEE 802.11 standard for wireless networks is a standard for systems that operate in the 2,400-2,483.5 MHz industrial, scientific and medical (ISM) band. The ISM band is available worldwide and allows unlicensed operation of spread spectrum systems. The IEEE 802.11 RF transmissions use multiple signaling schemes (modulations) at different data rates to deliver a single data packet between wireless systems.

In a wireless local area network, wireless clients obtain access to resources on the backbone network through the use of an access point. The backbone network is typically on a wired network, such as ethernet, but can also be a second wireless network or any combination thereof. When an access point provides connectivity to resources directly on a wired network, the access point will contain, amongst other things, a wired LAN interface, a bridge function, and a wireless LAN interface in order to bridge traffic between the wireless network and the wired network.

Most installations use wireless local area networks as an overlay to an existing ethernet (cabled or wired) network which serves as a backbone or provides access to a backbone and its resources. Typically, access points are provided at various locations to create continuous geographical coverage for the wireless network. Since 802.11 is limited to 30 meters in range and Ethernet is physically limited to 100 meters in length, office environments typically deploy several access points on different backbones. The various wireless access points are assigned to different wireless frequency spectra or channels to allow overlap between wireless ranges.

Constituent components of an access point typically include a LAN interface, a LAN hub, a bridge function, and a wireless LAN interface. Software is executed for performing router and network address translation functions. The constituent components typically act as independent units, i.e., peer-to-peer LAN, LAN backbone, and as independent peer-to-peer wireless LAN, for example. This independent operation of access point components allows for the access point to be very flexible.

A problem emerges, however, as a result of this independent operation of access point components. When a first ethernet backbone goes down the wireless LAN interface component of the access point continues to operate by providing independent peer-to-peer wireless LAN functionality. As such, wireless peer-to-peer clients are able to share mapped drives and other resources found on the wireless network. However, users connected to the access point are unable to reach network resources found on the first ethernet backbone. Meanwhile, another client in the same physical area which happens to be connected to a different access point which is connected through a second ethernet backbone can remain operational with full access to backbone resources. This resulting inconsistency in network resource availability is problematic because it raises the level of frustration for the users affected and raises the cost of computing as a direct result of increased help center calls.

A challenge found, however, is in mitigating this inconsistent network availability of clients according to autonomic computing principles.

SUMMARY OF THE INVENTION

It has been discovered that the aforementioned challenges are resolved by selectively dissociating clients on a wireless network when a degraded performance condition is detected on the backbone coupled to an access point. In order to select which clients are dissociated first, a predetermined client dissociation policy is established. In specific embodiments, the policy can include priority, bandwidth utilization, elapsed time since last transfer, and, amongst other criteria, whether the client is currently transferring in peer-to-peer mode on the wireless Network. Upon detecting the degraded condition, either immediately or after a predetermined delay to ensure that the degraded condition is not temporary, clients on the wireless network are dissociated according to the preestablished policy.

Once dissociated, the clients are then forced to seek association in order to reach resources on the backbone. In specific embodiments, the access point experiencing the degraded backbone performance can reduce the rate at which clients are thereafter associated or eliminate association of new clients altogether. In doing so, according to the present invention, the clients will tend to find alternative access points which are not experiencing degraded performance or are not experiencing the same level of degraded performance.

In a specific embodiment where the degraded condition is a network outage, the established policy can be set to dissociate all clients. Preferably, those clients which are currently engaged in peer-to-peer communications on the wireless network are not dissociated until after the peer-to-peer communications complete.

In a specific embodiment where the degraded condition is a reduced network throughput condition, the policy can be set to selectively dissociate clients based on any or all conditions such as client status, client priority, client bandwidth, and elapsed time of last client transfer. Preferably, those clients which are currently engaged in peer-to-peer communications on the wireless network are not dissociated until after peer-to-peer communications complete.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in a specific embodiment," and similar language throughout this specification may, but do not necessarily, all refer to the same embodiment.

Figure 1:
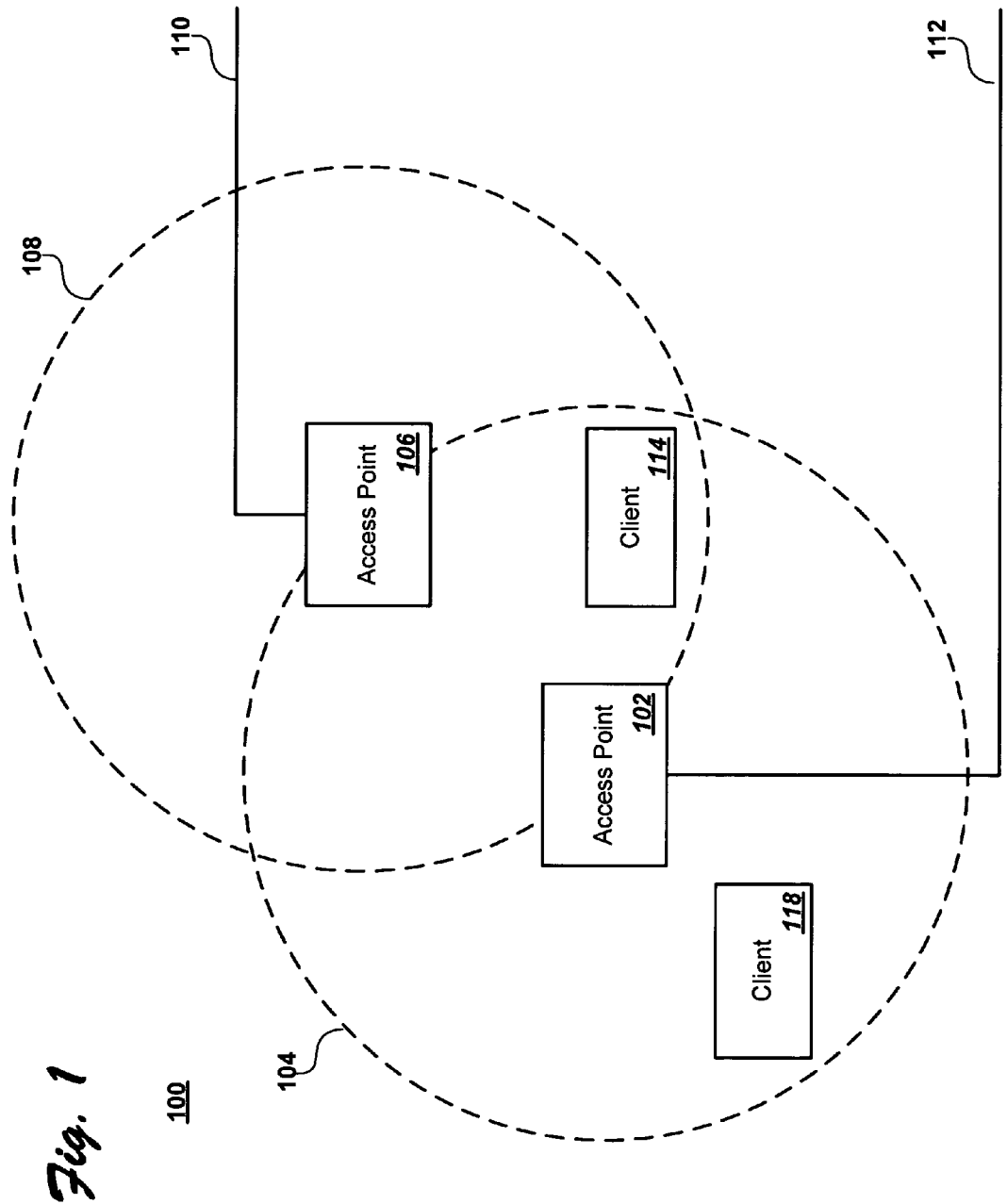
FIG. 1 depicts a scenario in which the concepts of the present invention are advantageous.

Referring now more particularly to the accompanying drawings, FIG. 1 depicts a scenario in which the concepts of the present invention are advantageous. Installation 100 consists of two access points 106 and 102 each having roughly circular geographical areas of coverage 108 and 104 respectively. Access points provide access to distributed resources and services via wireless medium for associated wireless clients or stations. Preferably, access points 106 and 102 contain IEEE 802.11 medium access control functionality and physical layer interface to the wireless medium. Wireless clients 114 and 118 are used here to represent a variety of wireless clients throughout installation 100. The wireless clients 114 and 118 are typically and preferably mobile computing units such as laptops and palmtops. As mobile units, clients 114 and 118 typically would not have printing capabilities nor other resources which would require hardware too large to hand carry. Such printing capabilities and other resources are found on backbone networks 110 and 112 which are coupled, according to installation 100, to two access points 106 and 102 respectively. Access points 106 and 102, in turn, provide the resources and services of the backbone network on to the wireless network in order to make the resources and services available to the wireless clients 114 and 118.

Backbone networks 110 and 112 provide installation 100 with the distributed resources and services. The resources and services include but are not limited to print servers and printers, e-mail servers, fax servers, database servers, and Internet access. Backbone networks 110 and 112 are preferably ethernet local area networks, optionally however, connections 110 and 112 can be wireless or optical distribution schemes to the same resources and services. In addition, backbone connections 110 and 112 can be bridge connections which in turn provide the resources and services of the backbone network.

Wireless clients 114 and 118 and are able to be configured in ad hoc mode and thereby engage in direct peer-to-peer data transfers and sharing of each other's resources when their respective signal strengths allow for direct connection. Otherwise, clients 114 and 118 are able reach each other through the backbone networks 110 and 112; in which case, their communications would be through the access points to which they are associated.

Figure 2:
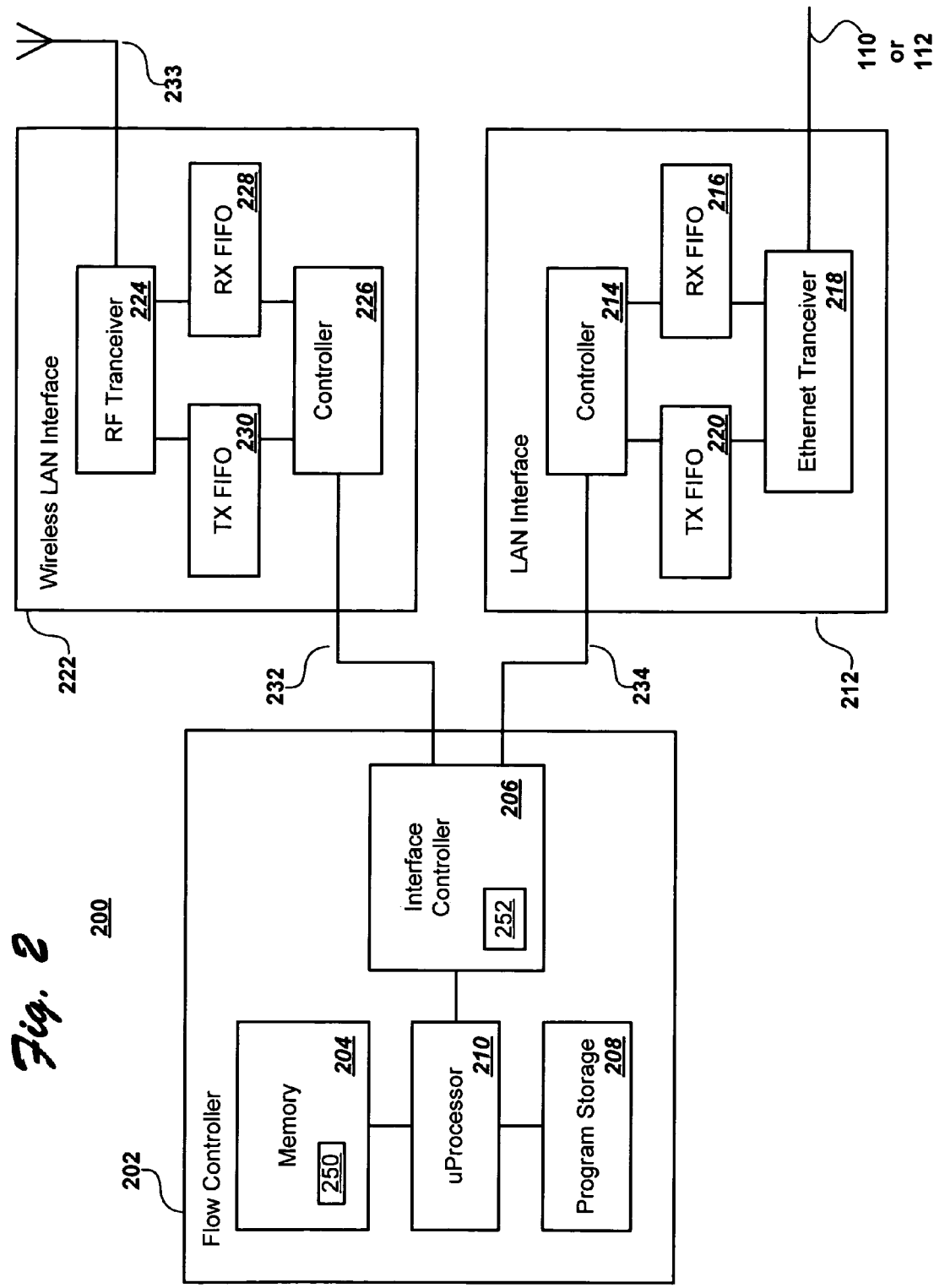
FIG. 2 is a block diagram of an access point configured according to an embodiment of present invention.

FIG. 2 is a block diagram of an access point configured according to an embodiment of present invention. Access point 200 includes wireless LAN interface 222, a bridge FIFO or flow controller 202, and a LAN interface 212. Wireless interface 222 can be any wireless interface using any wireless medium such as RF, infrared, VHF, UHF, and microwave. However, in the preferred embodiment, wireless LAN interface 222 is implemented as an 802.11 compliant wireless local area network interface. LAN interface 212 can be a wired land-based network interface, an optical network interface such as a fiber-optic network interface, or even a second wireless network interface. However, in the preferred embodiment, LAN interface 212 is implemented as an interface for an ethernet land-based network. LAN interface 212 typically connects to or bridges to a backbone network which provides resources and services. Wireless LAN interface 222 provides the resources and services found on the backbone network to wireless clients which are associated to wireless LAN interface 222.

The term—association—as used herein refers to that service which is used to establish access point to client mapping and enable client invocation of the resources and services found on the backbone network.

Bridge FIFO/flow controller 202 bridges and controls the flow of traffic between wireless clients coupled through wireless LAN interface 222 and the backbone network coupled to LAN interface 212. Flow controller 202 maintains a FIFO buffer for bidirectional traffic between interfaces 222 and 212. Flow controller 202 can be implemented entirely in hardware, or partially in hardware and partially in software/firmware. In the preferred embodiment as shown in FIG. 2 however, flow controller 202 is implemented with a microprocessor 210 having program storage 208 which stores boot code and microcode for execution on a microprocessor 210. The boot code is typically executed directly from program storage 208 while the microcode is typically transferred to memory 204 for faster execution. Flow controller 202 also includes an interface controller 206 which performs the lower-level functions including handshaking functions required across interface 232 to the wireless LAN interface 222 and across interface 234 to the LAN interface 212.

The construction of wireless LAN interface 222 includes a physical layer RF transceiver 224, transmit and receive FIFO's 230 and 228 respectively, and a low-level controller 226 for interfacing to the flow controller via interface 232. Wireless LAN interface 222 includes an antenna 233 for coupling electromagnetic energy to the atmosphere. Notice that the term—RF—is used herein as to be consistent with the IEEE 802.11 specifications. Throughout the IEEE 802.11 specifications the direct sequence spread spectrum (DSSS) system therein described targets an RF LAN system having a carried frequency in the 2.4 GHz band designated for industrial, science, and medical (ISM) applications as provided in the USA according to FCC 15.247. In other words, the actual modulation frequencies used by the RF transceiver 224 are in the 2.4 GHz microwave ISM band rather than in the frequency band traditionally known as "RF."

The construction of LAN interface 212 includes a physical layer ethernet transceiver 218, transmit and receive FIFO's 220 and 216 and a low-level controller 214 for interfacing to the flow controller via interface 234. Ethernet transceiver 218 is coupled to the backbone network 110 or 112.

Controller's 226 and 214 can be implemented in hardware, or as a combination of hardware and software/firmware components. In the preferred embodiment however, controllers 226 and 214 are implemented in hardware for faster operation.

Wireless LAN interface 222 and LAN interface 212 implement at least the physical and medium access control layers of the ISO LAN networking model. Higher ISO layers are implemented in the flow controller 202. However, it is possible to implement the higher layers of the ISO model in interfaces 222 and 212.

Further details concerning the construction and use of access point 200 shall be described in relation to the flow charts which follow. Certain details concerning the construction and use of access points are well known in the art and are omitted so as to not obfuscate the present disclosure in unnecessary detail.

Figure 3:
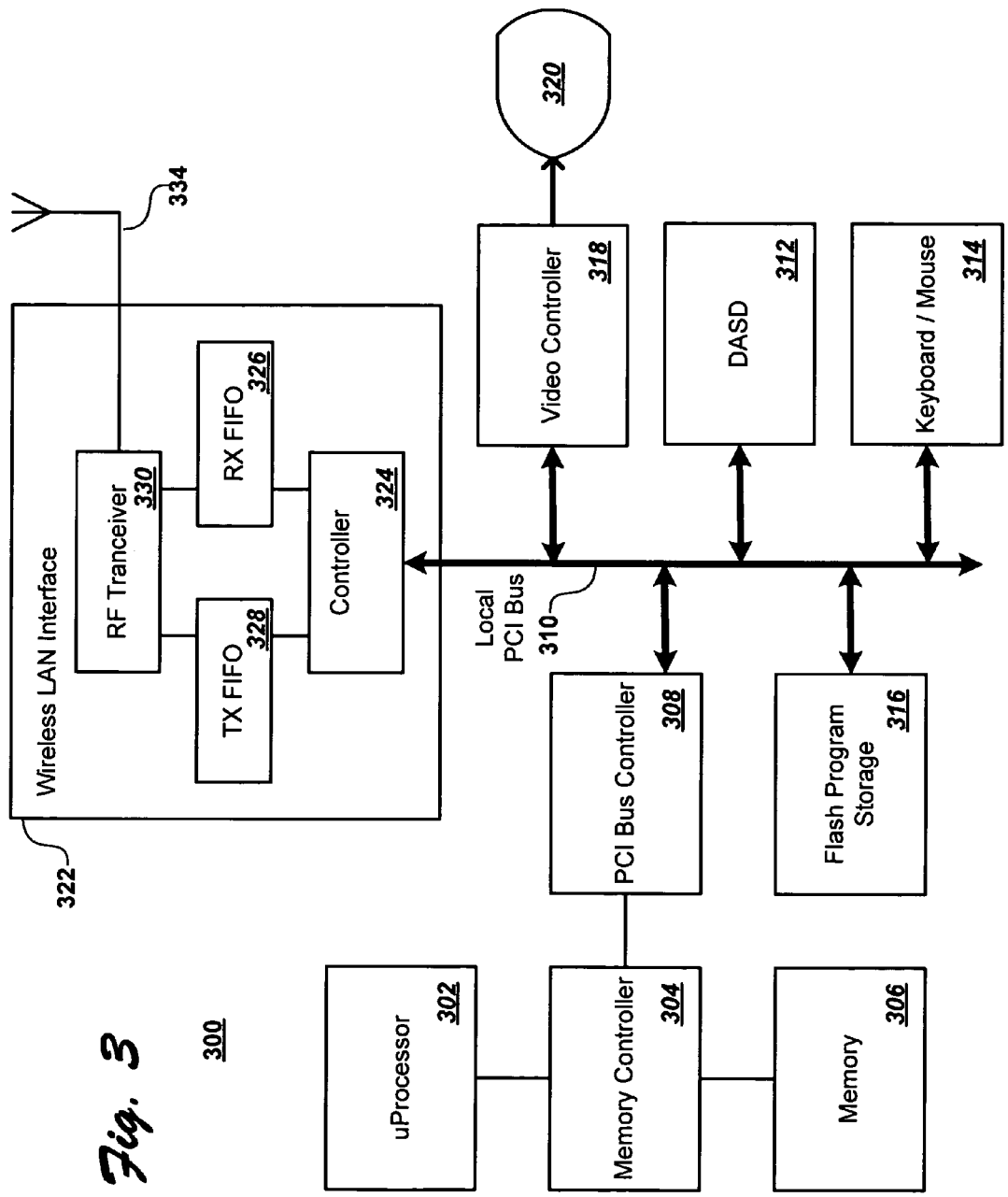
FIG. 3 is a block diagram of a client configured according to an embodiment of the present invention.

FIG. 3 is a block diagram of a client configured according to an embodiment of the present invention. The client 300 includes a physical layer RF transceiver 322, transmit and receive FIFO's 328 and 326 respectively, and a low-level controller 324 for interfacing to other components of client 300 through PCI bus 310. Wireless LAN interface 322 includes an antenna 334 for coupling electromagnetic energy to the atmosphere.

Controller 300 further includes video controller 318 which provides control signals to video LCD display 320. PCI bus controller 308 operationally couples a variety of modules within client 300. A standard processing subsection is coupled to PCI bus controller 308 and consists of a microprocessor 302, a memory controller 304, and to memory 306. Microprocessor 302 receives its boot code from flash program storage 316 through PCI bus controller 308. A storage module 312 provides the client with DASD storage for storing application software and application data, and for storing and executing operating system code. Client 300 also includes a keyboard and mouse interface 314 which is coupled to PCI bus controller 308. Keyboard and mouse interface 314 accepts user input from a supplied keyboard and mouse. Establishing association and wireless connection to access point 200 according to the logic shown in FIG. 4, for which a detailed description shall be given in the description which follows, can be performed by controller 324 of wireless LAN interface 322 or by the microprocessor 302 and the controller 324. However in the preferred embodiment the association and wireless connection to access point 200 is implemented entirely in controller 324 according to logic depicted in FIG. 4.

Figure 4:
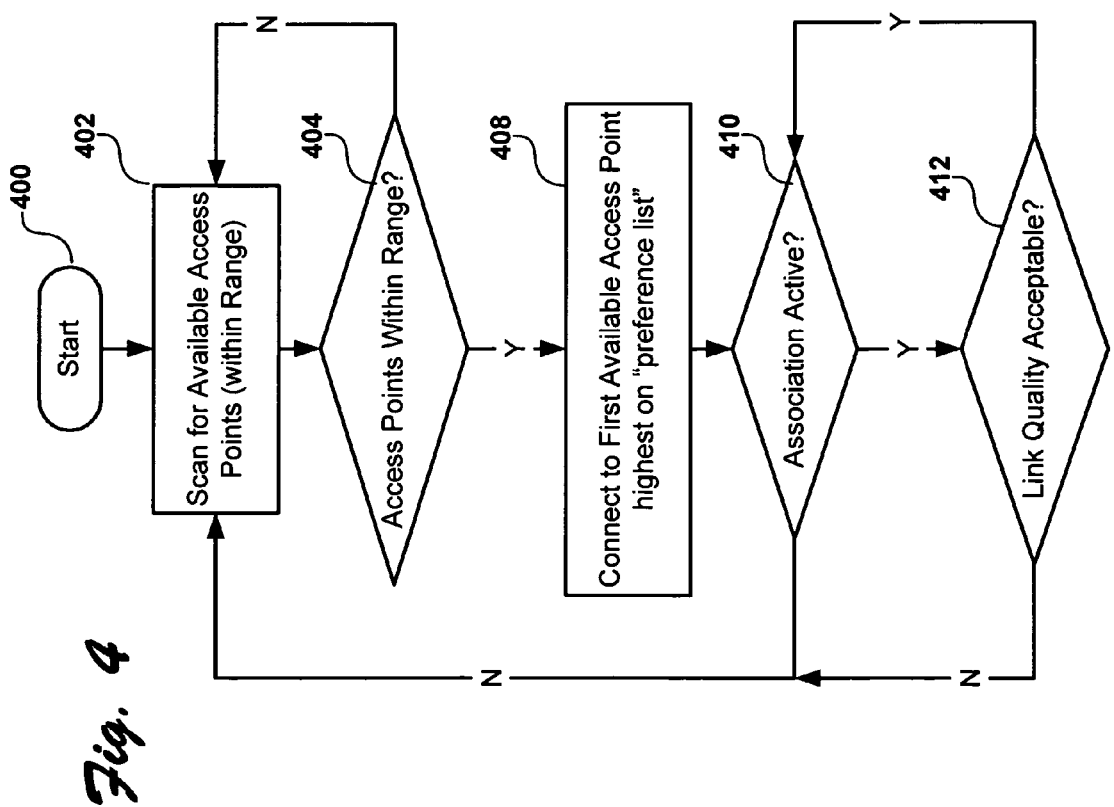
FIG. 4 is a flow diagram depicting the logic exercised by the client of FIG. 3 in maintaining and/or establishing association with the access point of FIG. 2.

FIG. 4 is a flow diagram depicting the logic exercised by the client of FIG. 3 in maintaining and/or establishing association with the access point of FIG. 2. Initially 400, client 300 scans 402 for any available access points with in its geographical range. A decision 404 is then made regarding whether access points are found. If none are found, client 300 continues to scan 402 for available access points. If one or more access points are found, client 300 will associate and connect 408 to the first available access point which is found to be highest on a predetermined preference list. The preference list can be entered by a user or entered automatically by system administrators through the network upon initial setup. A user would tend to enter, toward the top of list, the access points with which they have had the most success. Often, this is an access point closest to where the user normally physically resides and therefore, by virtue of its proximity to the user, provides the highest signal strength and gives the best signal quality. The client 300 then makes a two phase 410 and 412 determination as to the status of the association and link. First, a determination 410 is made as to whether the association remains active. If the association is not active, client 300 then continues to scan 402 for available access points. If the association is still active, client 300 then makes a determination 412 as to whether the link quality is acceptable. Link quality does not remain static for a variety of different reasons and therefore must be checked periodically. For example, if the client 300 is roaming, i.e., physically moving whether by public transit, automobile, or on foot, access point signal strength will diminish as the client moves away from the access point. Alternatively, link quality can degrade due to external electromagnetic interference. When it is determined 412 that the link quality is acceptable, client 300 maintains the association and proceeds to monitor the status 410 and the quality 412 of the connection. If it is determined 412 that the link quality is not acceptable, client 300 ventures out and scans 402 for alternative access points which might be available within its range in attempting to find a link with a higher level of signal quality.

Figure 5:
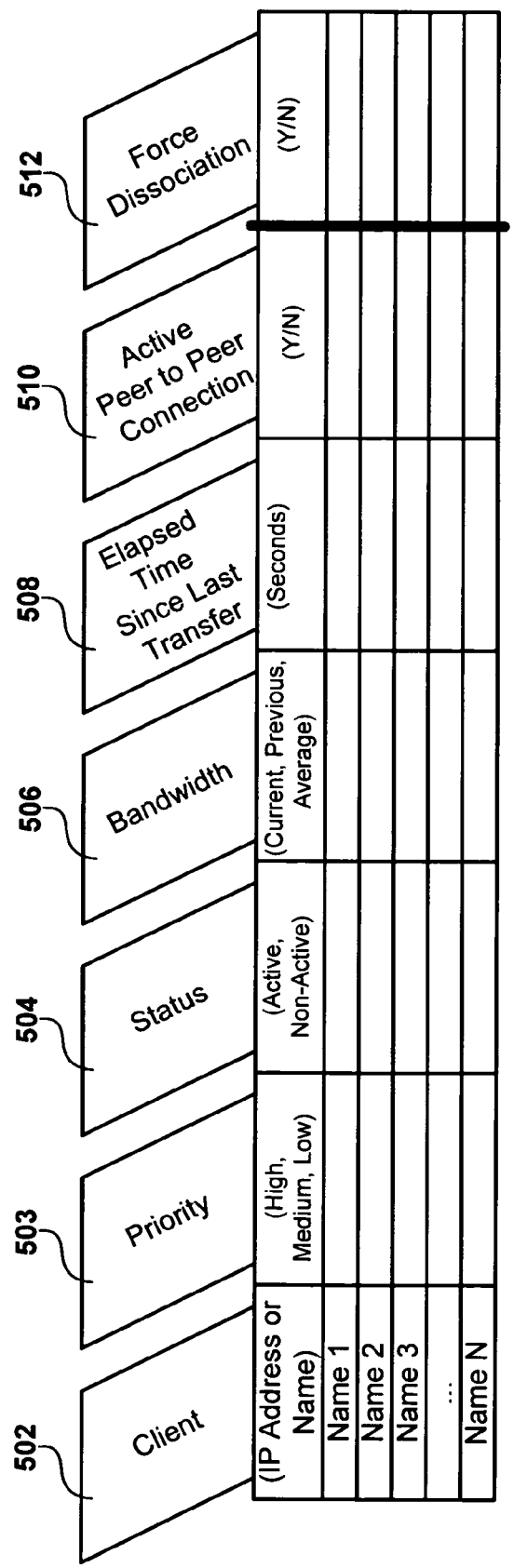
FIG. 5 is an illustration of the type of table that is maintained according to one embodiment of the present invention.

FIG. 5 is an illustration of the type of table that is maintained according to one embodiment of the present invention. More specifically the table 250 illustrated in FIG. 5 is used in conjunction with maintaining a client dissociation policy which aids in determining which clients are to be dissociated upon the occurrence of a degraded performance condition on the backbone network. Table 250 is maintained in memory 204 of flow controller 202 found in FIG. 2. Column 502 of table 250 maintains a reference for which clients the data in columns 503, 504, 506, 508, 510 and 512, which are to be described immediately hereafter, pertains. Column 502 can contain an IP address of the client or the client name. Column 503 contains an entry for giving priority to clients of certain accounts. This account priority column 503 allows for a tiered quality of service; for example, clients willing to pay for a higher level of service are, correspondingly, less likely to be dissociated. Column 504 maintains the status of clients. Clients who are active are set to be less likely to be dissociated first. Clients which are not active are indicated for early dissociation. In column 506 values are maintained which are indicative of client bandwidth utilization. The bandwidth datum of column 506 can indicate current bandwidth, previous bandwidth, or average bandwidth utilized by the client. In column 508 the elapsed time since the last transfer for each client is maintained. This can provide finer control of which clients are dissociated after all inactive clients have been dissociated. When the only clients left are active clients, column 508 provides a reference to determine which clients are more active than others. In the preferred embodiment, clients which appear to be more active, i.e., having elapsed time entry in column 508 which indicates a lower value of the elapsed time, are given priority and are dissociated last. In an alternative embodiment, clients which appear to be less active are given priority and are dissociated last. In column 510, entries are maintained indicative of which clients are presently involved in peer-to-peer communications over the wireless network. When entries in column 510 indicate that particular clients are engaged in peer-to-peer infrastructure communications, those clients are given highest priority because they have no present need for resources on the backbone network and are utilizing the wireless network to its fullest potential. Finally, a result vector is stored in column 512 indicating which clients are to be dissociated based on the aforementioned criteria described in relation to columns 503, 504, 506, 508, and 510. Results are posted to column 512 on a continual real-time basis by access point 200 of FIG. 2 and represent a decision as to whether each client is to be dissociated at each instance of time. As conditions change, for example, where a client that had been inactive, and therefore had an entry 512 indicating dissociation, and where that client becomes active again, a decision can be made to not dissociate that device. In this case, that decision would be posted as a change to the corresponding entry in column 512 of memory table 250.

Figure 6:
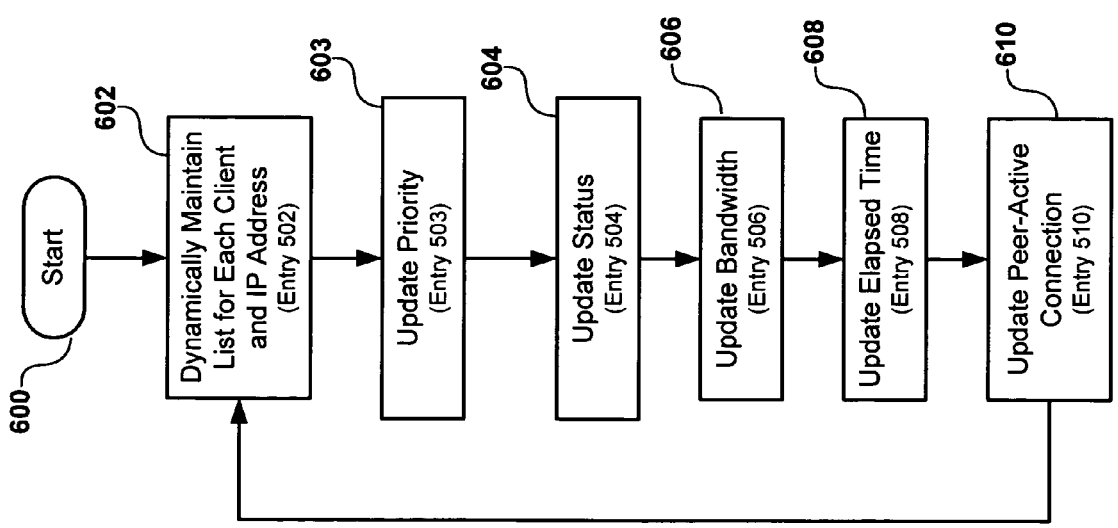
FIG. 6 is a flow diagram showing the logic exercised by the access point of FIG. 2 according to an embodiment of the present invention.

FIG. 6 is a flow diagram showing the logic exercised by the access point 200 of FIG. 2 according to an embodiment of the present invention. Referring now to FIG. 6 and to FIG. 2, processor 210 of flow controller 202 maintains the table 250 in memory 204. Interface controller 206 monitors the flow of traffic to and from the LAN interface 212 and wireless LAN interface 222 and maintains entries in the table 250 for each client on the wireless network coupled through interface 222. This task begins 600 by dynamically maintaining 602 a table entry 502 for each client and/or IP address encountered over the wireless network. For each client: an account priority entry 503 is updated 603 in table 250; the status entry 504 is updated 604 in table 250; the bandwidth utilized 506 is updated 606 in table 250; the elapsed time 508 since the last network usage of each client is updated 608 in table 250; and the type of connection 510 is updated 610 in table 250.

Figure 7:
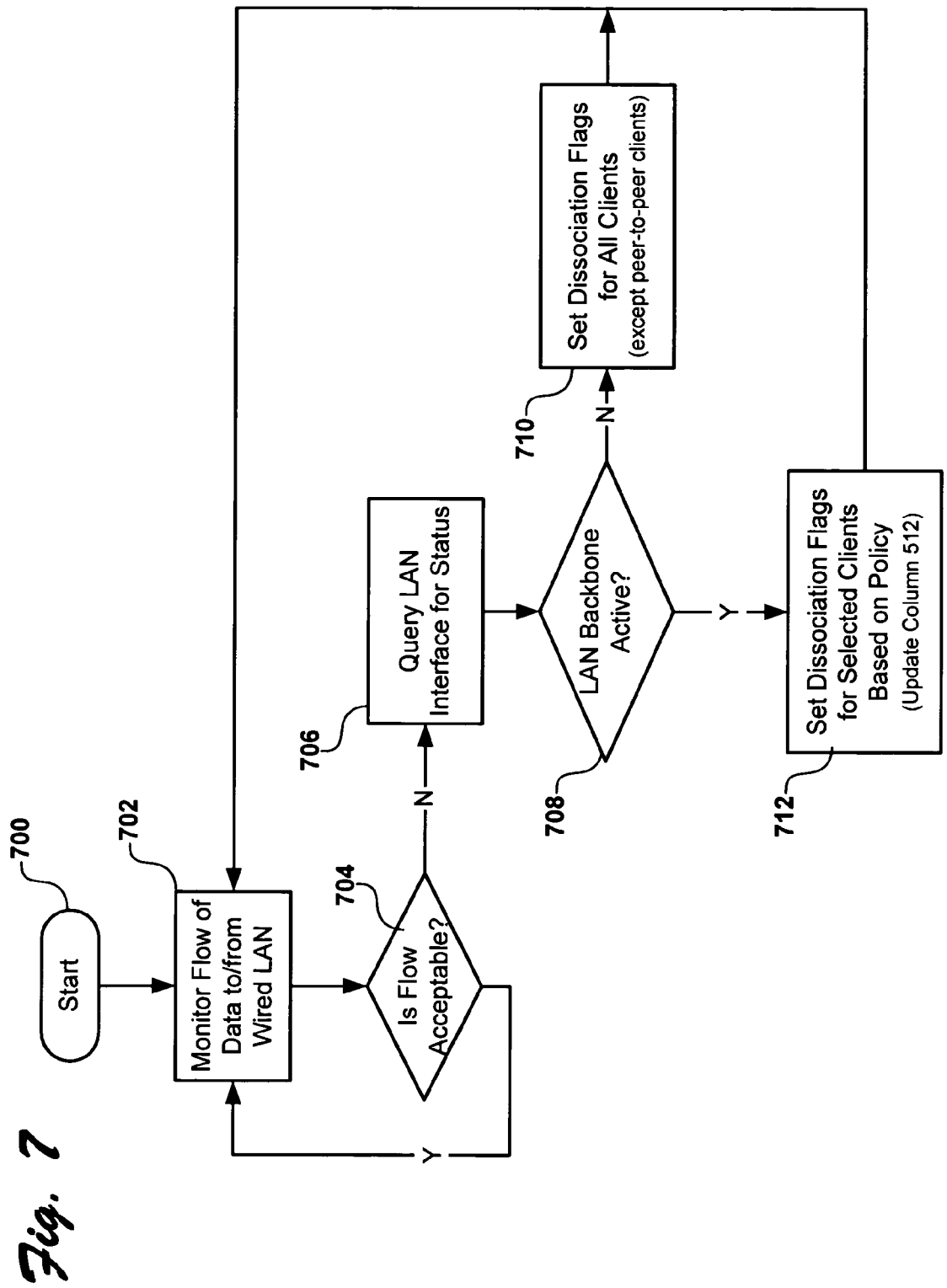
FIG. 7 is a flow diagram showing the logic exercised by the access point of FIG. 2 according to an embodiment of the present invention.

FIG. 7 is a flow diagram showing the logic exercised by the access point of FIG. 2 according to an embodiment of the present invention. Referring now to FIGS. 1, 2, and 7, an example will be given showing the operation of access point 200 in the case that backbone network 112 shown in FIG. 1 encounters a network outage or suffers a significantly degraded performance condition. Assume for the moment that backbone network 112 shown in FIG. 1 encounters a network outage, and assume that both clients 114 and 118 are associated to access point 102. In this case, both clients 114 and 118 will not be able to access the resources and services available on the backbone 112. However, it is still possible for client 114 to obtain access to backbone 110 through access point 106. This is achieved by the access point 200 in executing the logic shown in FIG. 7. Initially 700, access point 200 monitors 702 the flow of data to and from the wired LAN. In the case of a degraded network performance condition, the scenario and the desired outcome is the same with the only difference being that rather than clients 114 and 118 not been able to access resources, they are able to access to resources and services at a reduced bandwidth. The monitoring 702 is performed by the interface controller 206 of FIG. 2 by a traffic monitor 252 which monitors the LAN interface 212 for outages or degradation of performance. Alternatively, the monitoring 702 can be performed in software residing in memory 204 by microprocessor 210. In either implementation, the state of the backbone network is monitored by keeping track of packets and the time it takes to transfer them to and from the backbone. Actual transfer times are compared against preestablished times in determining whether the backbone is experiencing degraded performance. Additionally, aggregate bandwidth can be compared against predetermined thresholds in determining whether a degraded condition exists. A decision 704 is then made regarding the flow through the backbone. If it is decided 704 that the flow is acceptable, access point 200 maintains the status quo and continues to monitor 502 the flow on the backbone. If a decision 704 is made that the flow is unacceptable, a query 706 is then made to determine the status of the backbone coupled through LAN interface 212. This query 706 is to determine whether the backbone is down or whether the backbone is simply experiencing degraded performance. Additionally, the amount of time since the existence of the network outage or the degraded performance can be taken into account in determining the disposition and dissociation/association status of clients. If 708 the backbone is down, the dissociation flags 512 are set indicating that all clients are to be dissociated at wireless network interface 222 except (in the preferred embodiment) for those clients who are actively engaging in peer-to-peer communications on the wireless network 212. If 708 the backbone is still active, client dissociation flags 512 are set 712 based on the policy described in relation to FIG. 5.

Although a specific policy has been described with respect to a preferred embodiment, any such policy can be implemented. Any such policy, can include a policy to dissociate clients regardless of whether they are currently engaged in peer-to-peer communication as reflected in entry 510 of table 250. Stated another way, in one embodiment, the policy can be to dissociate all clients based only on the detection of the degraded condition on the backbone network.

Furthermore, a time delay can be added to any of the policies herein described to delay the dissociation of clients. The time delay is beneficial in cases where the degraded backbone condition is only temporary and the dissociation of clients would have been premature.

Figure 8:
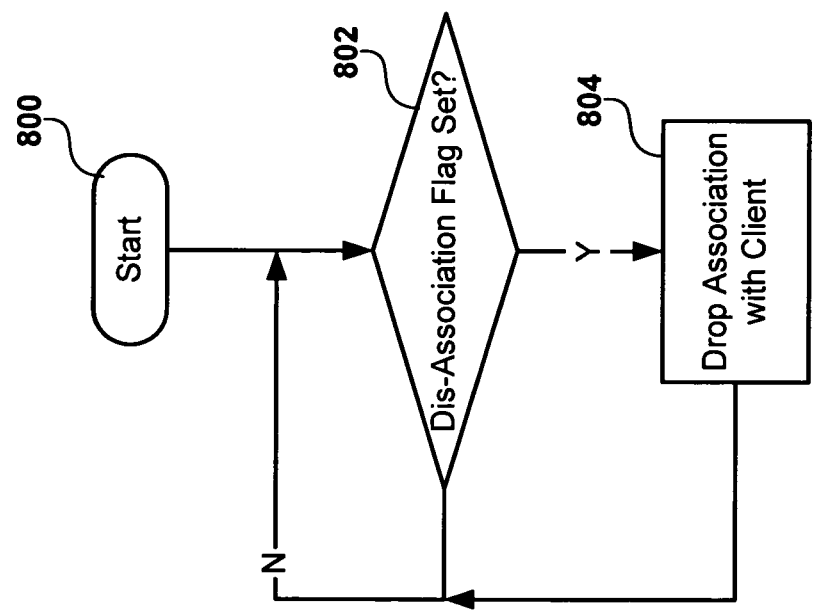
FIG. 8 is a flow diagram showing the logic exercised by the access point of FIG. 2 according to an embodiment of the present invention.

FIG. 8 is a flow diagram showing the logic exercised by the access point of FIG. 2 according to an embodiment of the present invention. The logic flow FIG. 8 is performed independently of other logic described in FIGS. 7 and 6 and acts on the result vector 512 of table 250. Initially 800, a simple check 802 is made for each client to determine if the dissociate flag has been set. If 802 the flag has been set, the association with that client is dropped 804. If 802 the flag has not been set, the client is not dropped and further clients are checked 802.

In the drawings and specifications there has been set forth a preferred embodiment of the invention and, although spe-

We claim as our invention:

1. Apparatus comprising:
   a first network interface;
   a wireless network interface; and
   a flow controller which is coupled to said first network interface and said wireless network interface and which establishes a predetermined client dissociation policy for associated clients provided on said wireless network interface, detects a degraded condition on said first network interface, and executes the established client dissociation policy in response to the detection on said first network interface.

2. Apparatus of claim 1 wherein the degraded condition is a network outage condition and wherein the established client dissociation policy includes a policy to dissociate all clients other than those which are observed through said wireless network interface to be engaged in peer-to-peer communications.

3. Apparatus of claim 1 wherein the degraded condition is a reduced network throughput condition and wherein the established client dissociation policy includes a policy to selectively dissociate clients other than those which are observed through said wireless network interface to be engaged in peer-to-peer communications based on criteria selected from the group consisting of client status, client priority, client bandwidth utilization, and elapsed time of last client transfer.

4. Apparatus comprising:
   a wired network interface;
   a wireless network interface; and
   a flow controller which is coupled to said wired network interface and said wireless network interface and which includes a processor and a memory for storing processor executable code, the code being effective when executing to:
      establish a client dissociation policy which includes a policy to maintain association with clients observed through said wireless network interface to be engaged in peer-to-peer communications;
      detect a degraded condition on said wired network interface;
   determine which clients are to be dissociated based on the established client dissociation policy;
      dissociate clients on said wireless network interface according to the policy based determination in response to the detection of degraded condition on said wired network interface; and
      reduce the rate at which new associations are made through said wireless network interface in response to the detection of degraded condition on said wired network interface.

5. Apparatus of claim 4 wherein the degraded condition is a network outage condition and wherein the established client dissociation policy further includes a policy to dissociate all clients other than those which are observed through said wireless network interface to be engaged in peer-to-peer communications.

6. Apparatus of claim 4 wherein the degraded condition is a reduced network throughput condition and wherein the established client dissociation policy further includes a policy to selectively dissociate clients other than those which are observed through said wireless network interface to be engaged in peer-to-peer communications based on criteria selected from the group consisting of client status, client priority, client bandwidth utilization, and elapsed time of last client transfer.

7. Apparatus of claim 4 wherein the code is further effective to:
   inform active clients on the wireless network of the degraded condition on said wired network interface.

8. Apparatus of claim 4 wherein the reduced rate is equal to zero.

9. Apparatus of claim 4 wherein the reduced rate is achieved by code selected from the group consisting of code which reduces the transmission rate of beacons which identify access through said wired network interface and code which refuses association requests from actively beaconing clients.

10. A method comprising:
    establishing a predetermined client dissociation policy;
    detecting a degraded condition on a first network which serves as the backbone for a wireless network; and
    executing said established client dissociation policy in response to said detection on the first network.

11. The method of claim 10 wherein the degraded condition is a network outage condition and wherein said established client dissociation policy includes a policy to dissociate all clients other than those which are engaged in peer-to-peer communications on the wireless network.

12. The method of claim 10 wherein the degraded condition is a reduced network throughput condition and wherein said established client dissociation policy includes a policy to selectively dissociate clients other than those which are engaged in peer-to-peer communications on the wireless network based on criteria selected from the group consisting of client status, client priority, client bandwidth utilization, and elapsed time of last client transfer.

13. A method comprising:
    establishing a client dissociation policy which includes a policy to maintain association with clients engaged in peer-to-peer communications on a wireless network;
    detecting a degraded condition on a wired network which serves as the backbone for the wireless network;
    determining which clients are to be dissociated based on said established client dissociation policy;
    dissociating clients on the wireless network according to said determination in response to said detection on the wired network; and
    reducing the rate at which new associations are made on the wireless network in response to said detection on the wired network.

14. The method of claim 13 wherein the degraded condition is a network outage condition and wherein said established client dissociation policy further includes a policy to dissociate all clients other than those which are engaged in peer-to-peer communications on the wireless network.

15. The method of claim 13 wherein the degraded condition is a reduced network throughput condition and wherein said established client dissociation policy further includes a policy to selectively dissociate clients other than those which are engaged in peer-to-peer communications on the wireless network based on criteria selected from the group consisting of client status, client priority, client bandwidth utilization, and elapsed time of last client transfer.

16. The method of claim 13 further comprising: informing active clients on the wireless network of the degraded condition on the wired network.

17. The method of claim 13 wherein said reduced rate is equal to zero.

18. The method of claim 13 wherein said reduced rate is achieved by a method selected from the group consisting of reducing the transmission rate of beacons which identify access to the wired network and refusing association requests from actively beaconing clients.

19. A product comprising:
a computer usable storage medium having computer readable program code stored therein, the computer readable program code in said product being effective to:
establish a predetermined client dissociation policy;
detect a degraded condition on a first network which serves as the backbone for a wireless network; and
execute said established client dissociation policy in response to said detection on the first network.

20. The product of claim 19 wherein the degraded condition is a network outage condition and wherein said established client dissociation policy includes a policy to dissociate all clients other than those which are engaged in peer-to-peer communications on the wireless network.

21. The product of claim 19 wherein the degraded condition is a reduced network throughput condition and wherein said established client dissociation policy includes a policy to selectively dissociate clients other than those which are engaged in peer-to-peer communications on the wireless network based on criteria selected from the group consisting of client status, client priority, client bandwidth utilization, and elapsed time of last client transfer.

22. A product comprising:
a computer usable storage medium having computer readable program code stored therein, the computer readable program code in said product being effective to:
establish a client dissociation policy which includes a policy to maintain association with clients engaged in peer-to-peer communications on a wireless network;
detect a degraded condition on a wired network which serves as the backbone for the wireless network;
determine which clients are to be dissociated based on said established client dissociation policy;
dissociate clients on the wireless network according to said determination in response to said detection on the wired network; and
reduce the rate at which new associations are made on the wireless network in response to said detection on the wired network.

23. The product of claim 22 wherein the degraded condition is a network outage condition and wherein said established client dissociation policy further includes a policy to dissociate all clients other than those which are engaged in peer-to-peer communications on the wireless network.

24. The product of claim 22 wherein the degraded condition is a reduced network throughput condition and wherein said established client dissociation policy further includes a policy to selectively dissociate clients other than those which are engaged in peer-to-peer communications on the wireless network based on criteria selected from the group consisting of client status, client priority, client bandwidth utilization, and elapsed time of last client transfer.

25. The product of claim 22 wherein said code is further effective to:
inform active clients on the wireless network of the degraded condition on the wired network.

26. The product of claim 22 wherein said reduced rate is equal to zero.

27. The product of claim 22 wherein said reduced rate is achieved by code selected from the group consisting of code which reduces the transmission rate of beacons which identify access to the wired network and code which refuses association requests from actively beaconing clients.

* * * * *